Patented Oct. 23, 1951

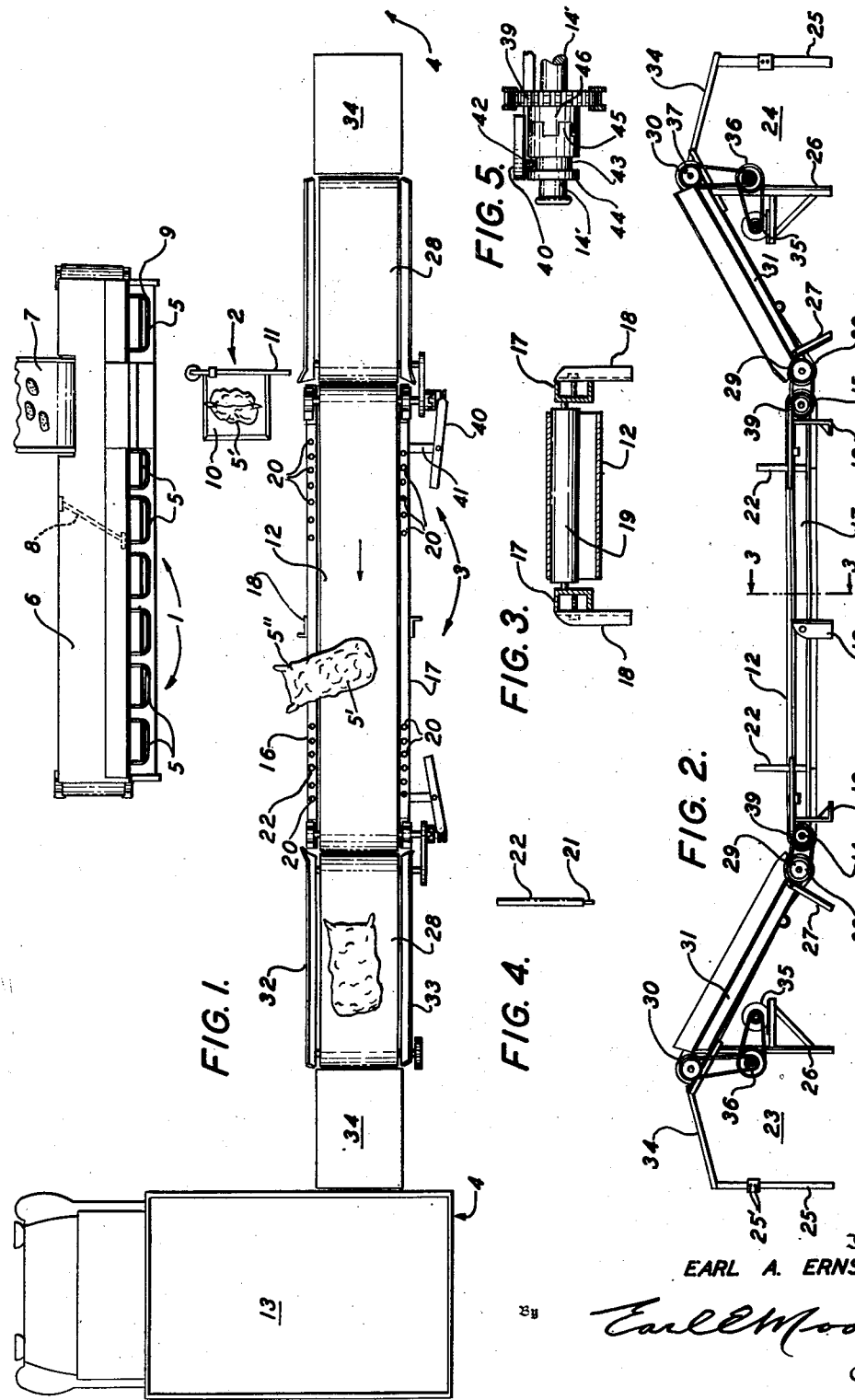

2,572,325

UNITED STATES PATENT OFFICE 2,572,325

CONVEYER ORGANIZATION FOR POSITIONING AND TRANSPORTING ARTICLES

Earl A. Ernst, Bakersfield, Calif.

Application January 13, 1947, Serial No. 721,837

3 Claims. (Cl. 198—29)

1

This invention relates to the method and apparatus for rapidly filling containers with products, sealing and weighing the containers when loaded, and then dispatching the filled containers in proper position to the station where they are stacked or/and stored for shipment or for a period of time. Means are provided for quickly and completely filling a plurality of containers with the products or things to be shipped or stored, followed by a quick weighing and sewing or other type or kind of sealing operation, and then the casting of the filled containers upon an endless type of conveyor which rushes them to a station for shipment or/and storage.

One of the principal objects of this invention is to present a new and novel method, as well as the means, for quick handling of articles from the place where they are placed in containers to the place where they are finally stacked which may be a storage room, a motor truck or trailer, a ship, or a waiting railway car.

Another object is to provide means wherein a method can be practiced which loads containers, weighs and seals them, and then shifts them in either of two directions to a final loading place, all the steps being carried out with dispatch and safety; the means employed being capable of long service, and easy to make and economical to manufacture.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 is a plan view of the invention showing a general conveying system with essential parts which may be used in order to practice same, Fig. 2 is the side elevational view of the front portion of that shown in Fig. 1, Fig. 3 is an enlarged sectional view taken substantially along line 3—3 of Fig. 2, Fig. 4 is an enlarged elevational view of a part employed in the invention, and Fig. 5 is an enlarged vertical view of a clutch employed in the invention.

The particular form of the invention, as illustrated, comprises four important stations; to wit:

2 station 1 where the articles, which are to be shipped, are placed into containers, station 2 where the filled containers are weighed and sealed, station 3 where the containers are shifted away from station 2, and two stations 4 where the containers are loaded upon shipping vehicles or shot into chutes or other means which carry the containers to places of storage.

Station 1 is provided with a plurality of sack or bag supports 5 which include frames for holding the tops of the sacks open so that the articles to be sacked can be shifted thereinto from the endless belt type carrier 6, this belt carrier being operable in either direction and receives its supply of articles form another endless belt carrier 7. Any suitable type of shear board or biased baffle means 8 may be employed for shifting the articles from the belt into the various desired sacks 5. Such a shear board and sack supporting means are clearly shown and explained in applicant's Patent Number 2,288,159 issued June 30, 1942. Below the sacks 5, there is a jigger platform 9 which is employed to support the bottoms of the sacks and jiggle them so as to settle the contents therein as they are being filled. Such a jigger platform and station similar to station 1 is illustrated in applicant's Patent Number 2,377,619, issued June 5, 1945. Also note applicant's Re. Patent No. 22,740, reissued April 2, 1946, which shows a jigger platform and the detailed means for jiggling it. In view of the foregoing, it is believed unnecessary to further explain or go into all the details as to how the station 1 apparatus may be constructed.

Station 2 includes a set of weighing scales having the platform 10 and the balancing beam 11 which may be of any of the well known type. On the platform of the scales is shown an upright sack 5' loaded with articles and which has had its top portion sewed at this point before the sack is thrown onto the endless belt carrier 12.

Station 3 is where the sacks are shifted rapidly to a waiting car, ship, or truck 13. The endless belt 12 is run over the end positioned rollers 14 and 15 which are journalled in the webs of the two elongated side channel irons 16 and 17, as shown; the channel irons being supported from the ground or floor by a plurality of legs 18 which are welded or otherwise suitably anchored to the sides of the channel irons. To maintain a level belt line, a plurality of rollers 19 are spaced along the channels and journalled in the web portions of the channels. The top and bottom flanges of the side channels are provided with a plurality of alined holes 20 which are adapted to receive the reduced ends 21 of the vertical posts, poles, or rods 22. These poles are designed so that they may be placed anywhere along the channel irons and be employed for turning the sacks on the conveyor 12 so that they will stay on and be in position for handling when they arrive at station 4.

The units 23 and 24, at the extreme ends of the center unit or belt carrier 12, are alike and may be used at either end of the belt 12. Each one of these end units has the long and paired supporting legs 25 and 26 to give the unit height for car and truck loading, and the paired spaced apart short legs 27 so that this end of the unit is substantially the same height as the center device. Each unit has an endless belt carrier means 28 which is looped around the lower roller 29 and the upper roller 30, these rollers being supported and journalled by the side runners or boards 31. Intermediate the end rollers, there are a plurality of small diametered rollers 19, as shown in Fig. 3, which give intermediate support for the belt 28 of each unit, and the belt may be provided with angle irons across the width thereof in the event the belt is inclined too steep to properly carry the sacks to the top thereof. To prevent the sacks from rolling off the sides of the belt 28, the side baffle boards 32 and 33 may be provided. A vertically adjustable inclined platform 34 is provided at each upper end of the belt means 28 of each unit to receive the sacks from the belt 28. This platform may be tilted enough to cause the sacks to roll into the car or truck, if desired, or inclined just enough to make it easy to pull the sacks therefrom when deposited by the belt. Any suitable collar means may be employed on each leg 25 so that two parts thereof can slide upon one another and then be fixed by a wing nut or nuts 25'.

Suitable means are employed for operating the endless belts. Each unit may have an electric motor 35 mounted upon a suitable platform or wall bracket, as shown, the motor on each unit having endless chain connection via a gear on the shaft of the motor and the large gear of a gear set 36, the small gear thereof having endless chain connection with a larger gear 37 which is keyed to a shaft of the top roller 30. The lower roller of each end unit has a gear 38 which has endless chain connection with a similar gear 39 at either end of the center belt 12, the gear 39 being keyed to the shaft of its roller. The belt 12 is adapted to run in either direction depending upon which end thereof there is a waiting vehicle to be loaded.

Clutch means are provided at the ends of the shafts 14' of the rollers 14 and 15. The clutch is shifted by a lever 40 which is pivoted to a strut 41 that extends outwardly from the channel iron side to which it is fixed. The lever is provided with a pin 42 which works in the groove 43 of a collar 44, this collar having sliding relationship with the shaft 14' upon which it is supported. To one side of the collar, there is a serrated portion 45, the teeth-like parts of which interfit with similar teeth-like projections upon the circular clutch portion 46. The operator can thus cause the belt 12 to run in either direction by simply shifting the lever 41.

Note, in particular, that the removable poles 22 may be placed and held rigidly upright in any of the holes 29 of the flanges of the channels 16 and 17. When the belt is in operation, say in the direction indicated by the arrow on belt 12 in Fig. 1, the sewed end 5'' of the sack may be projecting to one side of the belt, but when this end strikes the pole 22, the sack is worked onto the belt automatically because of the force of the moving belt carrying the sack against the immovable pole 22.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In an endless belt device, a pair of spaced apart elongated side channel members which have their top and bottom flanges perforated, the perforations in the top flange of each channel being larger than those in the bottom flanges but each large perforation being alined with a smaller one, large roller means at each end of the device having its shafts journalled in the channels, an endless belt looped about the rollers and held taut by a plurality of smaller rollers journalled in the channels and spaced between the large roller means, a plurality of poles positioned in predetermined alined perforations for use in shifting material that overhangs the belt to positions entirely within the confines of the belt, a sprocket keyed to one end of each of the shafts of the larger roller means linked by a chain with a driving means, and a clutch means having a lever control at each sprocket so that the belt can be driven in either direction by shifting the proper clutch lever in the manner described.

2. The device recited in claim 1 wherein each pole is provided with a reduced end, the reduced end being sized to enter snugly the small perforations in the bottom flanges.

3. In an endless belt device, a pair of spaced apart elongated side channel members which have their top and bottom flanges provided with a plurality of alined perforations, poles in selected perforations, a large roller at each end of the device and which rollers have shafts that are journalled in the ends of the channels, an endless belt looped to the rollers, a clutch unit on each shaft, a driving means linked to the clutch unit at each end of the device and a portion of each unit having a keyed connection with its respective roller shaft, and a lever control for each clutch unit.

EARL A. ERNST.

REFERENCES CITED

The following references are of record in the file of this patent:

UNITED STATES PATENTS

| Number | Name | Date |
|---|---|---|
| 1,179,383 | Adderson | Apr. 18, 1916 |
| 1,284,667 | Harris | Nov. 12, 1918 |
| 1,381,053 | Anderson | June 7, 1921 |
| 1,617,301 | Reddick et al. | Feb. 8, 1927 |
| 1,825,038 | Anderson | Sept. 29, 1931 |